United States Patent Office 3,173,757
Patented Mar. 16, 1965

3,173,757
PURIFICATION OF STRONTIUM SOLUTIONS BY ION EXCHANGE
Earl J. Wheelwright, Lane A. Bray, Francis P. Roberts, and Robert L. Moore, Richland, Wash., assignors to the United States of America as represented by the United States Atomic Energy Commission
No Drawing. Filed Sept. 7, 1962, Ser. No. 222,242
14 Claims. (Cl. 23—102)

This invention details with a process of concentrating and purifying aqueous strontium-containing solutions. More particularly, this invention is concerned with the treatment of aqueous waste solutions as they are obtained in the extraction of dissolver solutions of neutron-irradiated uranium with tributyl phosphate-hydrocarbon mixtures in the so-called Purex process. Aqueous Purex waste solutions contain a great number of radioactive fission products among which $Sr^{90}$ is one of the most troublesome ones because of its high degree of radioactivity and its intermediate half-life (28 years). It emits beta particles at an almost constant level and does not decay fast enough to make reduction of its radioactivity by aging possible. For this reason the removal of $Sr^{90}$ prior to disposal of the radioactive waste is vital.

Another reason for the strontium removal from aqueous Purex waste solutions is its recovery as a highly desirable fission product which does not emit gamma rays, but only beta particles. For this reason it is useful as a pure beta source and suitable, for instance, as a topical remedy in ophthalmology. Another application of $Sr^{90}$ is in thermoelectric power units where it is preferably employed in the form of strontium titanate. For all these purposes it is essential that the strontium be not contaminated by gamma-emitting isotopes, such as rare-earth fission products.

Aqueous Purex waste solutions have been processed heretofore by various methods to recover the $Sr^{90}$ and at the same time to separate it from rare earths including $Ce^{144}$, and from $Ru^{103+106}$, $Zr$—$Nb^{95}$ and $Cs^{137}$. One of the processes in use comprises complexing iron ions with tartrate; precipitating the strontium and a large portion of the rare earths on lead sulfate at a pH of between 1 and 2; leaching the precipitate with a sodium hydroxide-sodium carbonate solution whereby lead ions are dissolved and the strontium and rare earths are precipitated as the carbonates; dissolving the carbonate precipitate in nitric acid; precipitating rare earths with oxalic acid; precipitating the strontium as the carbonate at a pH value of about 10; and dissolving the carbonate in nitric acid. The solution thus obtained is the so-called Purex "Crude Concentrate," which contains most of the strontium, but which is still contaminated to an undesirably high degree with various fission products. A typical composition of the Purex crude concentrate contains 0.32 g./l. (25.6 curies/l.) Sr; 0.1 g./l. Ca; 0.05 g./l. Ba; 8.0 g./l. Fe; 5.6 g./l. Pb; 10.0 g./l. Na; 70 curies/l. Zr—$Nb^{95}$; and 750 curies/l. Ce—$Pr^{144}$, all in the form of nitrates.

It is an object of this invention to provide a process for treating Purex crude concentrate solutions by which a strontium solution of relatively great purity and high concentration is obtained.

It is also an object of this invention to provide a process for treating crude concentrate solutions which is relatively simple.

It is also an object of this invention to provide a process for treating crude concentrate strontium solutions by adsorption on and fractional elution from cation exchange resins for which only a small volume of resin is necessary.

It is finally also an object of this invention to provide a process for treating crude concentrate strontium solutions by adsorption on and fractional elution from cation exchange resins in which little radiation damage of the resin occurs.

Stoichiometric complexing of iron, lead and the undesired fission products in the crude concentrate was found to be very difficult. The high dilution of analytical samples, made mandatory by the large amount of radioactivity involved introduced analytical errors of a magnitude comparable to the amount of strontium present in the crude concentrate. It was found, however, that selective complexing could be accomplished by using a weak acid, such as N-hydroxyethylethylenediaminetriacetic acid (hereinafter simply referred to as HEDTA), as a complexing agent if the pH value of the solution was within a critical range of between 3.5 and 5; the complexing weak acid also has to be reasonably soluble in water. Under these conditions all fission products and other impurities, except alkaline earth and alkali metal values, were complexed and converted to compounds nonadsorbable by cation exchange resins, while the alkaline earth and alkali metal values remained uncomplexed even when an excessive amount of the weak-acid complexing agent was used. The process of this invention utilizes this finding.

The process of this invention comprises diluting the crude concentrate with water, whereby a feed solution is obtained that contains rare earths, alkaline earths and alkali metal, iron, lead, zirconium and niobium values; adding an excess of a weak-acid complexing agent to the solution, adjusting the pH of the solution to a value between 3.5 and 5, whereby most fission product values are complexed but the alkaline earth metal values remain uncomplexed; passing the solution over a cation exchange resin, whereby the noncomplexed alkaline earth metal values are adsorbed while the lead, iron, and fission products other than alkaline earths are complexed and remain in the solution; separating the solution from the resin; and contacting the resin with a complexing solution for the alkaline earth metal values whereby they are eluted from the resin in the order of increasing atomic numbers, while fractionally collecting a predominantly calcium-containing solution and a predominantly strontium-containing solution.

The high sodium content of the Purex crude concentrate combined with the fairly large amount of ammonium ion added during the pH adjustment step yields a high and unfavorable molar ratio of monovalent to divalent ions in the prepared feed solutions and a consequent low strontium absorption capacity. Dilution of the Purex crude concentrate with water does not change the monovalent to divalent ion ratio but does shift the absorption equilibria in a direction more favorable to strontium. Dilution to form twice to five times the volume is usually sufficient. The relationship of concentration of feed solution and strontium adsorption will be demonstrated later in Example I.

Various weak-acid complexing agents may be used for the selective complexing of lead, iron, and fission products other than alkaline earth metal values in the feed solution. HEDTA is one of the most suitable complexing agents for this purpose, but citric acid and tartaric acid are also satisfactory.

The step of complexing the lead, iron, and the bulk of the fission products is a very vital phase of the process. By it adsorption of most fission products is prevented and a lesser volume of resin is required; if the iron, lead, rare earths, zirconium and niobium were to be maintained in their noncomplexed state, they would also be adsorbed and would occupy a large portion of the cation exchange resin. For quantitative adsorption of strontium a tremendous volume of resin would be necessary. Furthermore, by complexing the gamma-emitting fission products and converting them into a nonadsorbable form, the period of contact of these fission products with the resin is reduced to a minimum, especially when a continuous column operation is employed, so that there is little chance for radiation damage to the resin; the high radioactivity of isotopes, such as $Ce^{144}$ and $Zr-Nb^{95}$, would cause a prohibitively high damage to the resin if adsorbed thereon.

In order to obtain the selective complexing effect and retain the alkaline earths in their uncomplexed form adsorbable by resin, the pH value must be adjusted to between 3.5 and 5, and preferably to about 4; ammonium hydroxide is best used for pH adjustment. The complexing agent can be, and advantageously is, added in an excessive quantity, a molar excess of between 20 and 40% being the preferred quantity.

All cation exchange resins are suitable for the process of this invention. A resin commercially available under the name Dowex 50 cross-linked to 12% was used for the investigations for the process of this invention. Dowex 50 is made according to Example I of U.S. Patent No. 2,366,007 granted to D'Alelio on December 26, 1944. The particle size of the resin may vary widely, but particles between 20 and 100 mesh were used with especially good results. While a coarse particle size within this range is preferred for the adsorption phase of the process to prevent clogging of the resin, the finer resin is preferred for banding and elution. For the coadsorption of the alkaline earth values, the resin is preferably used in the ammonium form.

Adsorption as well as desorption can be carried out at room temperature or at elevated temperature; a temperature within the range of from 25 to 40° C., however, was preferred.

After adsorption of the alkaline earth metal values, the resin is washed with a 0.1 M solution of HEDTA whose pH had been buffered with ammonium hydroxide to a pH value of about 4 to remove adhering feed solution; no strontium is removed in this step. Retained HEDTA solution is then washed off with water.

Thereafter the elution step proper is carried out. In this step the adsorbed alkaline earth metal values are desorbed from the resin and washed onto another resin bed or column for further purification and banding into individual alkaline earth sections. In these banding columns the resin is best employed in the calcium form. As the eluant, a complexing solution is used that forms water-soluble complexes with the various adsorbed alkaline earths of different degrees of stability and consequently desorbs them. An about 0.03 M solution of ethylenediaminetetraacetic acid (hereinafter referred to as EDTA) buffered with ammonium hydroxide to a pH value of between 8.4 and 8.8 is preferably used for fractional elution of the alkaline earth from the resin, but a solution of HEDTA is also suitable.

The first eluate fraction predominantly contains the calcium and any residual cerium and lead; it is discarded as waste. As soon as the strontium begins to show in the effluent, a new eluate fraction is started, and the strontium fraction is separately collected until barium begins to appear in the effluent.

This strontium fraction may then be passed, for final purification, over another bed or column of resin in which the resin preferably is in the copper, mixed copper-hydrogen, yttrium or neodymium form. By this, the bulk of the strontium is concentrated on the last "purification column." The copper, yttrium or neodymium serves as a barrier ion to restrain the leading edge of the front band and to keep all bands compact so that the resin can be saturated to full capacity and the lengths of the individual bands do not change as they move down the column. To convert the resin to the mixed copper-hydrogen form, for instance, it is contacted with a solution about 0.5 M in copper sulfate and about 0.5 M in surfuric acid.

The barrier ion is then removed from the resin prior to elution of the strontium, for instance, with a 0.1 M solution of HEDTA whose pH value had been adjusted with ammonium hydroxide to about 4.0. Strontium is not removed by this eluant. The adhering HEDTA solution is then washed off with water.

Finally, the strontium is eluted from the resin. Various eluants are satisfactory for this purpose; for instance, an about 0.1 M solution of HEDTA or of EDTA having a pH value of about 8.5 to 9 accomplishes this result. Other suitable solutions are an about 5 M ammonium nitrate solution of a pH of about 1 or a nitric acid solution of a concentration between 3 and 8 M, but preferably between 4 and 6 M.

A strontium solution of a high degree of purity is obtained by the process, as will be demonstrated in the examples below. By decreasing the volumes in subsequent eluants, also a concentration effect will be brought about by the process of this invention.

*Example I*

A synthetic HEDTA-complexed feed solution was prepared that contained 0.4 g./l. of strontium; 0.15 g./l. of calcium; 1.62 g./l. of lead; 8.34 g./l. of iron; 13.7 g./l. of $NH_4^+$ ion; and 50 g./l. of HEDTA. It had a pH value of 4.0.

Dowex 50 resin was charged with this solution until a 10% breakthrough occurred, and the adsorption capacity for strontium (g. Sr/l. resin) was then determined. It was found to be 12 g. Sr/l. resin.

A parallel second experiment was then run with the same feed solution in which, however, the $NH_4$/Sr mole ratio had been increased from the above 167

$$\left(\frac{13.7 \times 88}{18 \times 0.4}\right)$$

to 364. This brought about a reduction of the capacity to 2.8.

Then a third and a fourth run were carried out, the third run with the feed solution used in the second experiment but diluted with water twofold and the fourth run with the feed solution of the second experiment diluted fourfold. The respective resin capacities obtained in these two runs were 6.4 and 11.7 g. Sr/l. resin.

This clearly shows that a high monovalent to divalent ion ratio (due to a high concentration of sodium and ammonium ions) lowers the strontium absorptive capacity of the resin and that by dilution of the feed solution, the quantity of strontium purified, using a given amount of resin, can be drastically increased.

The next example shows the effect of the pH value on the selective strontium adsorption.

*Example II*

A feed solution was prepared synthetically that contained strontium in a concentration of 0.0045 M; calcium in a concentration of 0.0038 M; lead 0.0078 M; iron 0.15 M; sodium 0.58 M; HEDTA 0.18 M; inactive cerium 0.00005 M; and tracer concentrations of $Ce^{144}$ and $Sr^{90}$ for analyzing by counting.

Various portions of this solution were passed, at room temperature, over a 30-cm. long column of Dowex 50 resin of a particle size of between 50 and 100 mesh; each portion had been given a different pH value by the addition of different volumes of ammonia. The flow rate in each instance was 5 ml./min./cm.$^2$. The percentage of cerium adsorbed and the resin capacity for strontium at the respective breakthrough points were determined. The results are summarized in the table below.

| pH | Cerium Adsorbed, Percent | Resin Capacity for Sr, g./l. |
|---|---|---|
| 2.0 | 100 | 12 at 7% breakthrough. |
| 3.0 | 30 | 10 at 1% breakthrough. |
| 3.5 | 4 | 12 at 6% breakthrough. |
| 4.0 | <4 | 12 at 10% breakthrough. |
| 5.0 | <1 | 10-12 at 10% breakthrough. |

These results show that a relatively high strontium capacity with little cerium adsorption can be achieved at a pH value of about 4.0.

*Example III*

Three adsorption columns were used having a diameter of 4 inches and a height of 9 feet. These columns were filled to a height of 8 feet with Dowex 50, X-12 (crosslinked to 12%), resin in the ammonium form; the particle size of the resin ranged between 50 and 100 mesh. In addition, three more columns were used which had a diameter of 2 inches and were also filled with 8 feet of resin of the same particle size as that of the adsorption columns. In columns 4 and 5, the so-called banding columns, the resin was in the calcium form, while the resin in column 6, the purification column, had been converted to the mixed copper-hydrogen form. This latter conversion had been effected by washing the resin with a solution 0.5 M in copper sulfate and 0.5 M in sulfuric acid.

435 liters of an actual crude strontium concentrate, as it was obtained from Purex waste solution, were used. The concentrate contained 0.3 g./l. of strontium (25.6 curies/l.); 0.1 g./l. of calcium; 0.05 g./l. of barium; 8.0 g./l. of iron; 5.6 g./l. of lead; 10.0 g./l. of sodium; 70 curies/l. of Zr—Nb$^{95}$; and 750 curies/l. of Ce—Pr$^{144}$. To this solution there was added HEDTA in a quantity about 20% excessive of the amount necessary to complex all iron, lead and rare earths. Thereafter the solution was diluted with water to a volume of 940 liters. Then the pH value of the solution was adjusted to about 4.0 by the addition of ammonia. The total Sr$^{90}$ content of the feed solution thus obtained was 11,136 curies/l.

The feed solution was consecutively pumped through the three adsorption columns at a flow rate of 9 ml./min./cm.$^2$. A total of 8126 curies of Sr$^{90}$ was adsorbed in this step within a period of 54 hours when strontium breakthrough occurred in column 3.

The three columns were then washed with an aqueous solution of 0.1 M HEDTA of a pH value of about 4 to remove excess feed solution and then with water to remove adhering wash solution.

After this, banding column 4 was connected in series with column 3, and elution of the alkaline earth was started by pumping a solution of 0.03 M EDTA (pH 8.82) through columns 1–4, still connected in series; the flow rate of this eluant was about 4 ml./min./cm.$^2$. Within 101 hours a total of 410 liters had been passed through the three adsorption columns. When the band reached the bottom of column 4, column 5 was also connected with the system, that is, with column 4 in series. The adsorption columns were disconnected one after the other, as they were washed free from adsorbed alkaline earths. When the strontium band had moved down to the bottom of column 5, it was relatively free from calcium and barium. Elution was continued until no more calcium came off the column and strontium started to appear in the effluent. The first, calcium-containing, fraction of the eluate was sent to waste.

At this point, column 6, the final purification column for the product solution, was connected in series with column 5, and elution was continued through columns 4, 5 and 6. When the strontium band had been entirely eluted onto column 6, column 5 was disconnected to avoid any substantial transfer of barium to column 6; column 6 was then treated separately. The treatment of column 6 consisted of removal of the copper barrier with a 0.1 M solution of HEDTA (pH about 4), followed by a water wash to remove the HEDTA.

Finally the product, the strontium, was desorbed from the resin of column 6 with a solution of 0.1 M HEDTA (pH 8.8). After 10½ hours all strontium had been washed off column 6, and 24 liters of product solution had been obtained. This product solution contained a total of 7950 curies of Sr$^{90}$. It had the following contents of contaminants: less than 2% each of calcium and barium; less than 0.1% if iron; less than 0.2% of lead; 0.07 curie of Zr—Nb$^{95}$; and less than 2 curies of Ce—Pr$^{144}$. The decontamination factor $$\left(\frac{\text{amount of Ce—Pr}^{144} \text{ in feed} \times \text{amount of Sr in eluate}}{\text{amount of Sr in feed} \times \text{amount of Ce—Pr}^{144} \text{ in eluate}}\right)$$

for Ce—Pr$^{144}$ was $1 \times 10^5$ and that obtained for Zr—Nb$^{95}$ was $3 \times 10^4$.

*Example IV*

The conditions for this run were identical with those of Example III with the exception that the resin in the adsorption columns 1, 2 and 3 had a particle size of between 20 and 50 mesh and that column 6 contained the resin in the yttrium form, which was obtained by passing yttrium nitrate over the resin. The crude solution had the same composition as that for Example III.

898 liters of the crude concentrate were converted to 2640 liters of feed solution by the addition of HEDTA and water as in Example III and subsequent pH adjustment. The feed solution in this instance contained Sr$^{90}$ in a total quantity of 17,300 curies. Within 97 hours, 15,800 curies of Sr$^{90}$ had been adsorbed on the three adsorption columns. The columns were washed as in Example III with HEDTA solution and then with water, and then the alkaline earth values were desorbed from the adsorption columns with 492 liters of EDTA solution (pH 8.45). Elution of the alkaline earths from the adsorption columns onto the banding columns took 130 hours. Removal of the yttrium barrier from column 6 was accomplished as that of copper in Example III. Then the strontium was desorbed with a 5 M solution of ammonium nitrate whose pH had been adjusted with nitric acid to a value of 1.0. Five hours were required for desorption of strontium; a product solution was obtained that contained a total of 13,300 curies of Sr$^{90}$.

The strontium product solution was contaminated by 1.9% of calcium, 1.1% of barium, less than 0.1% of iron, less than 0.2% of lead, 0.07 curie of Ce—Pr$^{144}$ (decontamination factor of $3 \times 10^6$) and 0.01 curie of Zr—Nb$^{95}$ (decontamination factor of $9.8 \times 10^5$).

*Example V*

The conditions were similar to those of Examples III and IV. Three adsorption columns, two banding columns and one purification column of the same dimensions as before were used. The three adsorption columns contained resin in a particle size of between 20 and 50 mesh and the other three columns in a particle size of between 50 and 80 mesh. The resin in columns 1–3 was in the ammonium form, that in columns 4 and 5 in the calcium form and that in column 6 in the neodymium form (obtained by passing Nd(NO$_3$)$_3$ solution over the resin). HEDTA in a concentration of 2.3 M and of a pH value of 4 was again added to the feed solution in an excess 40% over the amount necessary to complex all of the iron and lead. The complexed feed solution was adjusted to a pH value of about 4 and the temperature was maintained at between 30 and 35° C.

762 liters of crude concentrate were processed in this example. They contained a total of 19,800 curies of $Sr^{90}$, 8700 curies of $Zr-Nb^{95}$, $3.4 \times 10^5$ curies of $Ce-Pr^{144}$, 7.8 g./l. of iron, 2.6 g./l. of lead, 29 g./l. of sodium and 63 g./l. of nitric acid. Water was added to this solution so as to yield a total volume of 3398 liters. Then the complexing agent was added and the pH value was adjusted to approximately 4. After absorption, column wash and elution of alkaline earths onto the banding columns and onto the purification column 6 were carried out as in Example IV. Strontium was finally desorbed with a solution of 5 M ammonium nitrate in which the pH had been adjusted with nitric acid to 1.0.

The product solution contained a total of 16,500 curies of $Sr^{90}$; this corresponded to 201 grams of strontium. Analysis showed that this strontium product solution contained less than 1 gram each of calcium and barium, less than 1 curie of $Ce-Pr^{144}$ and less than 1 curie of $Zr-Nb^{95}$.

Adsorption can be carried out either as a batch operation or in a continuous manner; the latter is preferred. Elution has to be carried out continuously, using resin columns and flowing the various solutions through the columns to obtain the fractionation by the "banding" effect.

It will be understood that the invention is not to be limited to the details given herein but that it may be modified within the scope of the appended claims.

What is claimed is:

1. A process of separating strontium values from an aqueous solution containing said strontium values together with lanthanide rare earth metal values, calcium values, sodium and cesium values, iron, lead, ruthenium, zirconium and niobium values, comprising adding a weak-acid complexing agent selected from the group consisting of N-hydroxyethylethylenediaminetriacetic acid, tartaric acid and citric acid; adjusting the pH of the solution to a value of between 3.5 and 5, whereby all metal values are complexed but the calcium and strontium values which remain uncomplexed; passing the solution over a cation exchange resin, whereby the noncomplexed calcium and strontium values are adsorbed on the resin, while the complexed metal values remain in the solution; separating the solution from the resin; and contacting the resin with a complexing solution selected from the group consisting of ethylenediaminetetraacetic acid, N-hydroxyethylenediaminetriacetic acid, ammonium nitrate and 3 to 8 M nitric acid for the calcium and strontium values, whereby they are eluted from the resin in the order of increasing atomic numbers, while collecting a predominantly calcium-containing solution and a predominantly strontium-containing solution.

2. The process of claim 1 wherein the complexing agent is used in an excessive amount over that required for complexing the values with the exception of the alkaline earth metal.

3. The process of claim 2 wherein the excess of the complexing agent ranges between 20 and 40%.

4. The process of claim 1 wherein the complexing agent is a solution of N-hydroxyethylethylenediaminetriacetic acid and the pH value of the complexed feed solution is adjusted to about 4.

5. The process of claim 1 wherein the resin for the coadsorption of all the values is in the ammonium form and the eluted solutions are passed over a resin in its calcium form for banding the alkaline earth metal values.

6. The process of claim 1 wherein the complexing solution is selected from the group consisting of 0.03 M ethylenediaminetetraacetic acid and 0.3 M N-hydroxyethylethylenediaminetriacetic acid having a pH value of between 8.4 and 8.8.

7. The process of claim 1 wherein the calcium-containing solution and the strontium-containing solution are collected fractionally and the strontium-containing solution is then passed over another resin that contains a barrier ion, said barrier ion being selected from the group consisting of copper, yttrium and neodymium.

8. The process of claim 7 wherein the barrier is eluted, before the alkaline earths are removed from the resin, with a 0.1 M complexing solution of N-hydroxyethylethylenediaminetriacetic acid of a pH value of 4 and then the adhering complexing solution is washed off with water.

9. The process of claim 7 wherein the strontium is eluted, after barrier removal, with an aqueous strontium-complexing solution selected from the group consisting of N-hydroxyethylethylenediaminetriacetic acid, ethylenediaminetetraacetic acid, ammonium nitrate and nitric acid.

10. The process of claim 9 wherein the strontium eluant is a 0.1 M solution of N-hydroxyethylethylenediaminetriacetic acid in which the pH has been adjusted to a value of between 8.4 and 9.

11. The process of claim 9 wherein the strontium is eluted with a 0.1 M solution of ethylenediaminetetraacetic acid.

12. The process of claim 9 wherein strontium is eluted with an about 5 M solution of ammonium nitrate whose pH has been adjusted with nitric acid to a value of about 1.

13. The process of claim 9 wherein the strontium is eluted with a nitric acid solution of a concentration of between 3 and 8 M.

14. A process of separating strontium values from an aqueous solution containing said strontium values together with lanthanide rare earth metal values, calcium values, sodium and cesium values, iron, lead, ruthenium zirconium and niobium values, comprising adding N-hydroxyethylethylenediaminetriacetic acid to said solution in a quantity excessive by between 20 and 40 molar percent over that required for the complexing of the metal values other than alkaline earth metal values; adjusting the pH value of the solution with ammonia to about 4; passing the solution over a cation exchange resin in the ammonium form whereby the calcium and strontium are adsorbed on said resin while the other metal values remain in the solution; washing the resin with an aqueous 0.1 M solution of N-hydroxyethylethylenediaminetriacetic acid having a pH value of 4 and thereafter with water; passing a 0.03 M solution of ethylenediaminetetraacetic acid whose pH value has been adjusted to about 8.8 over the resin and flowing the effluent from the resin which contains the calcium and strontium values over a resin in the calcium form and at the same time fractionally collecting the effluent whereby a calcium-containing effluent fraction and a strontium-containing effluent fraction are obtained; passing the strontium-containing effluent fraction over a cation exchange resin in the copper form whereby the strontium values are adsorbed on the resin; washing the copper off the resin with a 0.1 M solution of N-hydroxyethylethylenediaminetriacetic acid whose pH has been adjusted to 4; washing the resin with water; and eluting the strontium from the resin with a 5 M aqueous solution of ammonium nitrate.

References Cited by the Examiner

UNITED STATES PATENTS

| | | | |
|---|---|---|---|
| 2,798,789 | 7/57 | Spedding et al. | 23—23 X |
| 2,877,093 | 3/59 | Tompkins et al. | 23—23 |
| 2,895,798 | 7/59 | Blanco | 23—102 |

OTHER REFERENCES

Chablrek et al.: "Journal of Inorganic and Nuclear Chemistry," vol. 11, 1959, pages 184–196.

Majumdar et al.: "Anolytica Chimica Acta," vol. 24, April 1961, pages 356–359.

Khopkar et al.: "Anolytica Chimica Acta," vol. 23, November 1960, pages 441–445.

Tompkins et al.: "Journal of The American Chemical Society," vol. 69, November 1947, pages 2769–2777.

MAURICE A. BRINDISI, *Primary Examiner.*